S. P. TOWNSEND.
COMBINATION MOWER.
APPLICATION FILED MAY 29, 1914.
1,209,519.
Patented Dec. 19, 1916.
3 SHEETS—SHEET 1.
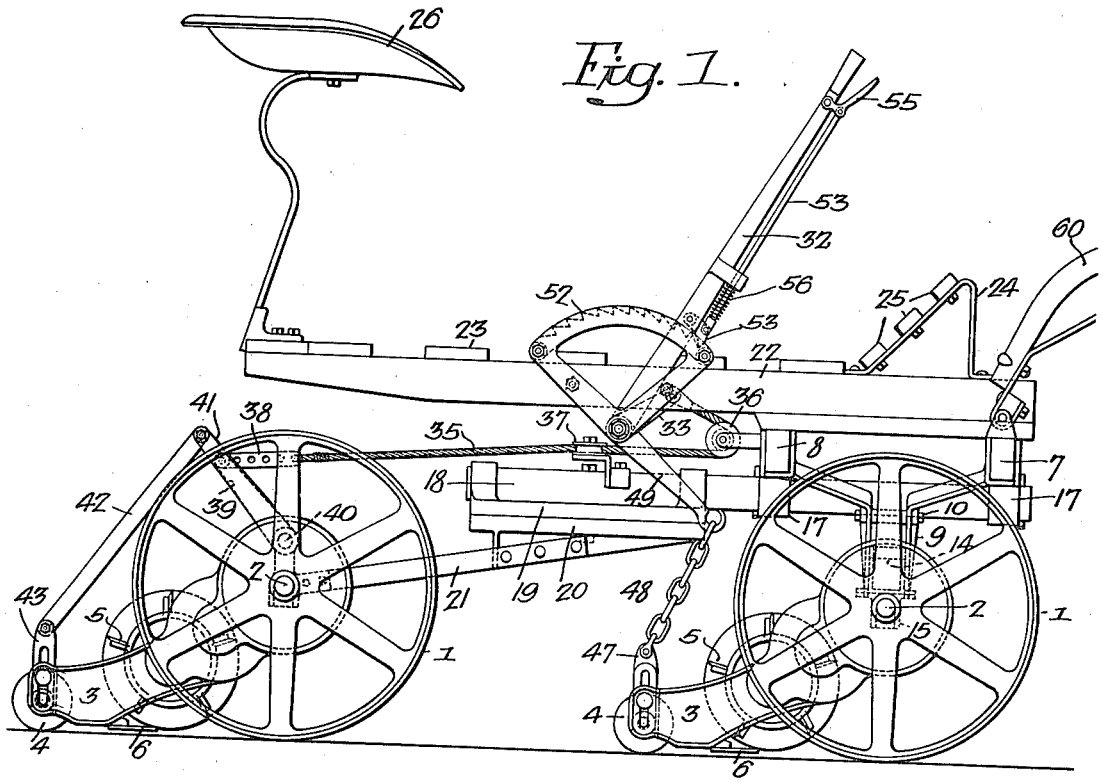
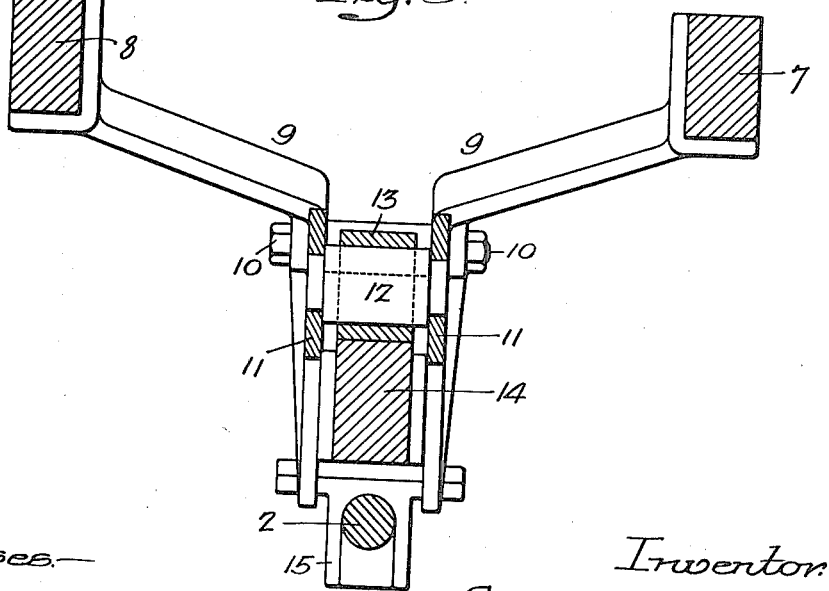
Witnesses
Will A. Barrows
Walter Thism
Inventor
Samuel P. Townsend
by his Attorneys
Howson & Howson S. P. TOWNSEND.
COMBINATION MOWER.
APPLICATION FILED MAY 29, 1914.
1,209,519.
Patented Dec. 19, 1916.
3 SHEETS—SHEET 2.
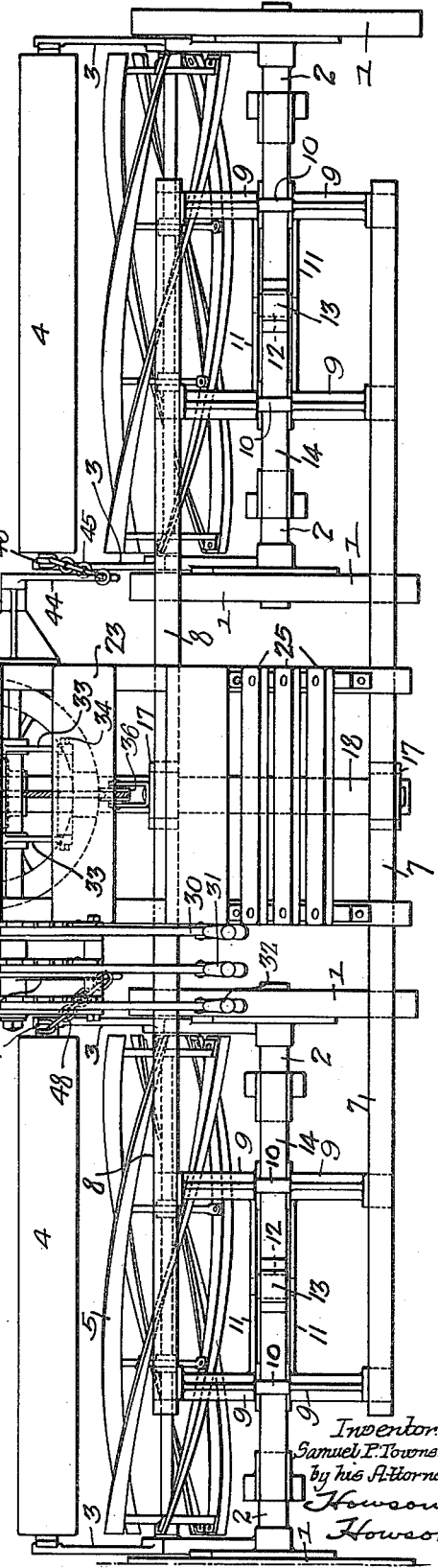
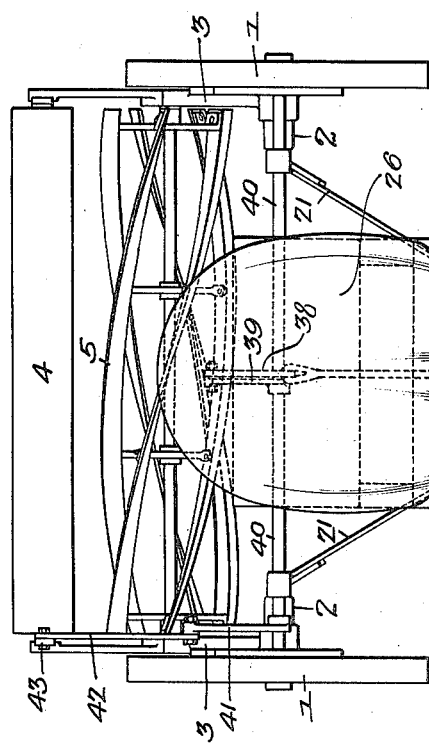
Fig. 2.
Witnesses
Willet Bronsont
Walter Chism
Inventor
Samuel P. Townsend
by his Attorneys
Howson
Howson

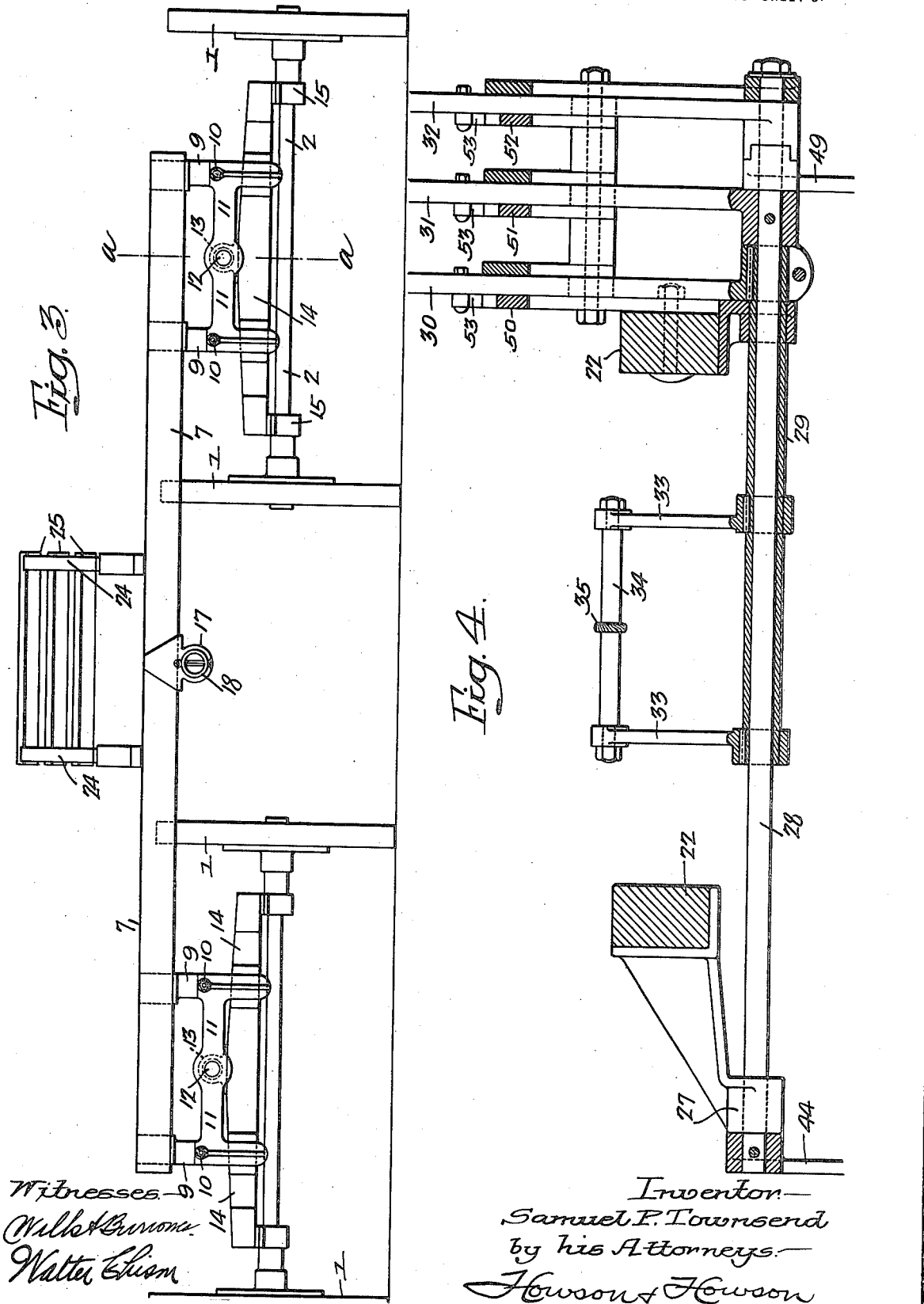

UNITED STATES PATENT OFFICE.

SAMUEL P. TOWNSEND, OF ORANGE, NEW JERSEY.

COMBINATION-MOWER.

1,209,519.  Specification of Letters Patent.  Patented Dec. 19, 1916.

Application filed May 29, 1914. Serial No. 841,861.

*To all whom it may concern:*

Be it known that I, SAMUEL P. TOWNSEND, a citizen of the United States, residing in Orange, Essex county, State of New Jersey, have invented certain Improvements in Combination-Mowers, of which the following is a specification.

One object of my invention is to provide a grass-cutting machine which, while being relatively simple and substantial in construction, shall have its parts so disposed as to make a considerably wider cut than has heretofore been possible with any machine known to me, the invention contemplating a novel structure for combining a plurality of lawn mowers so that they will operate properly when propelled by power from a suitable source.

A further object of the invention is to provide a novel frame for operatively connecting a plurality of mowing machines so that these may be caused to simultaneously cut a relatively wide swath, the invention also including novel means for throwing any one of the machines into or our of action at will, as well as means whereby each machine is free to adjust itself to any inequalities in the surface of the ground over which it is moved.

I also desire to provide a machine having the above characteristics with novel means whereby the driver or operator may be carried so that his weight is distributed in the proper manner between the individual mowing machines employed.

These objects and other advantageous ends I secure as hereinafter set forth, reference being had to the accompanying drawings, in which, Figure 1 is a side elevation of a mowing machine constructed according to my invention; Fig. 2 is a plan of the machine shown in Fig. 1; Fig. 3 is a front elevation of the frame; Fig. 4 is an elevation, partly in section, illustrating the connections and mountings of the controlling levers, and Fig. 5 is a vertical section on the line *a—a* Fig. 3.

According to the present invention, I provide a mowing machine consisting of a pair of lawn-mowers of any suitable construction, arranged in line with each other and maintained at a distance apart less than the length of one of them. A third lawn-mower, similar to the first two, is arranged behind them so that it will mow the strip of swath of grass between them.

In the above drawings 1 represents the traction wheels of the three mowing machines, each of which has side frames 3 connected by a rod 2, a grass roller 4 between the rear portions of said frames, a rotary reel 5, and a knife 6 placed to co-act with said reel. The frame of the machine is carried by these three lawn mowers and consists of two transversely extending parallel beams 7 and 8 each of which has adjacent each of its ends a pair of downwardly extending brackets 9 rigidly connected by bolts 10.

The brackets of each beam project toward those of the other, and then extend vertically down, as shown in Fig. 5, so that their lower ends are substantially parallel. The brackets of each pair are united adjacent their lower ends by an integral or other suitably attached web 11, and between the two adjacent webs belonging to the brackets at each end of the frames 7 and 8, extends a pivot pin 12 on which is rotatably mounted a casting 13 fixed to a bolster 14 extending substantially parallel to the beams 7 and 8 but considerably below them. Each of these bolsters 14 is guided and maintained in line with the other by downwardly extending parts of the brackets 9 and carries downwardly extending forked structures 15 designed to fit over the rod or shaft 2 of one of the mowing machines. Each of these members 15 has mounted between its branches a block 15$^a$ whereby movement of the rod 2 relatively to its bolster 14 is effectually prevented.

As shown in Fig. 3, each bolster is of such length as to fit between the traction wheels 1 of the mower to which it is attached and although it is rigidly connected to this latter, it is free to turn to a limited extent in a vertical plane on its pivot or hinge pin 12 in order to accommodate itself to any inequalities in the ground, while being maintained with its rod 2 in the vertical plane including the same rod of the other front mower.

Each of the beams 7 and 8 carries at its middle portion a bearing 17 in which is rotatably mounted a rearwardly extending, preferably tubular member 18 of a length about double the distance between the beams 7 and 8 and having fixed to its rear end the upper member 19 of a fifth wheel to which a lower member 20 is suitable connected in the manner well-known in the art. From this latter member a pair of divergent bars 21 extend rearwardly and have their extremities downwardly forked as indicated in dotted lines in Fig. 1 so that they may receive between them the transverse rod 2 of the rear mower. This transverse rod is clamped to these bars 21 which engage it adjacent the wheels 1, and with the arrangement illustrated it will be noted that the rear mower is so connected that it is free to swing on a vertical axis through the center of the fifth wheel which is placed to the rear of the front mowers. Moreover, these latter are spaced apart a distance somewhat less than the length of one of their reels so that the rear mower, which is preferably of the same size as those in front, will trail behind them and cut the swath of uncut grass left between said front mowers.

Upon the main frame beams 7 and 8 I fix two parallel rearwardly extending bars 22; rigidly connecting these at intervals by cross boards or planks to form a platform, at the forward end of which I provide a foot-rest formed by a bracket 24 on each of the side bars 22 with a sufficient number of transverse slats or boards 25. On the rear end of said longitudinally extending beams or bars 22 I mount any suitable form of seat 26 for a driver or operator.

In order to make possible the throwing of any machine into or out of action at will, I provide each of the side bars 22 with a bearing 27 and in these bearings mount a pair of concentric transversely extending shafts 28 and 29. Adjacent one end of these shafts I mount three hand levers 30, 31, and 32, of which the first is keyed to the outer or tubular shaft 29 which, adjacent its middle portion, has fixed to it a pair of arms 33 whose outer ends are connected by a rod 34. From this rod a metallic cable 35 extends forwardly to a sheave 36 supported on the rear face of the beam 8, thence between a pair of sheaves carried by the rear end of the fifth wheel supporting member 18. The rear end of this cable has fixed to it a bar 38 in which are a number of holes for the reception of a bolt whereby it is connected to an arm 39 fixed to a shaft 40 supported in suitable bearings carried by the rear ends of the divergent members 21. On this same shaft or spindle is fixed an arm 41 connected through a link 42 with an upwardly extending arm 43 attached to the rear end of the frame member 3 of the rear mower.

The second lever 31 is pinned or otherwise fixed to the internal shaft 28 adjacent one end thereof, and on the opposite end of said shaft is fixed a lever arm 44 connected through a chain 45 with an upwardly extending arm 46 carried by the rear end of the frame 3 of the right-hand forward mower. The left-hand forward mower likewise has an arm 47 projecting upward from the rear of one of its side frames 3 and this is connected through a chain 48 with an arm 49 attached to or forming part of the third lever 32 which is freely rotatable on one end of the shaft 28.

The several levers 30, 31, and 32 are provided with notched quadrants 50, 51, and 52, which are connected together and to one of the side members 22 in any suitable manner. In addition, each lever has a holding pawl 53 co-acting with the teeth of its quadrant and connected through a link 54 with a hand-grip 55, there being a spring 56 whereby the pawl is at all times retained in engagement with said teeth, although being removable therefrom when the hand-grip 55 is drawn toward the handle of the lever.

With this arrangement of parts it will be noted that the weight of a driver or operator on the seat 26 is distributed between the three mowers, any one of which may be placed and held out of action by suitable operation of its controlling lever. For example, if the lever 30 be drawn by the operator toward the seat 26, the reel, knife, roller, and side frames of the rear mower are rotated upwardly around the bearing 2 as an axis and obviously may be held in their raised position as long as desired by releasing the pawl 53 so that it is free to engage the teeth of its notched quadrant 50.

It will be noted that the rear machine may be operated as above described even though it may have swung in either direction on the fifth wheel as an axis so that it is not directly behind the two front mowers, as when the machine is being drawn around a curve. In such case the cable 35 would still be guided around one of the sheaves 37 and the whole device would readily operate as above described. Similarly, the rearward movement of either of the levers 31 or 32 would result in the swinging up of the roller, side frames, and cutting mechanism of the corresponding one of the front mowers, which could also be retained in its inoperative position by permitting the pawl 53 of its lever to engage its toothed quadrant. Any one of the mowers may be readily disconnected from the frame of the machine for replacement or repair, merely by removing the bolts 16 and the disconnection of its arm 43 or 46 from the elevating mechanism.

The three elevating levers are so placed as to be within convenient reach of a driver or operator on the seat 26 and it is to be understood that the machine may be propelled by any suitable means, although in the present case I have shown shafts 60 which would be employed for a horse drawn machine, though obviously other driving means may be employed without departing from my invention.

One of the important features of my invention resides in the connection between the rear mower and the frame, which is designed to permit said mower to turn on a vertical axis relatively to the frame as well as on the horizontal axis provided by the rotatable member 18. The fifth wheel and said member 18 therefore constitute a universal connection which permits the rear mower to accommodate itself to variations in the ground level and also to swing into proper position to cut the swath left uncut by the forward mowers especially while the machine is making a turn or operating in a curved line.

I claim:

1. A lawn mowing machine, having rows of mowers, each of said mowers comprising a rotary cutter and a co-acting cutter bar, and a frame carried solely by said mowers and having a unitary pivoted connection for the several rows of mowers located back of one row of mowers and in advance of the next row, said connection enabling one row of mowers to assume and operatively maintain a different horizontal angle from the other.

2. A lawn mowing machine, having rows of mowers, each of said mowers comprising a rotary cutter and a co-acting stationary cutter bar, and a horizontal unitary fifth wheel structure for the several rows of mowers, said structure being located back of one row of mowers and in advance of the next row, said fifth wheel enabling one row of mowers to assume and operatively maintain a different horizontal angle from the other.

3. A lawn mowing machine having in combination a frame; a plurality of longitudinally alined mowers attached to said frame in position to leave an uncut swath between them; a third mower connected to the frame in rear of the first named mowers so as to cut said swath; and a fifth-wheel structure located substantially midway of the front and rear rows of mowers to enable one row of mowers to assume and operatively maintain a different horizontal angle from the other, said frame being carried solely by the mowers and each of said mowers comprising a rotary cutter and a co-acting stationary cutter bar.

4. The combination in a mowing machine of a frame; two mowers attached to the frame in position to leave an uncut swath between them; a third mower attached to the frame in position to cut such swath; and a fifth-wheel between the third mower and the frame and located substantially midway of the rows of mowers.

5. The combination in a mowing machine of a frame; two mowers attached to said frame in line with each other but spaced apart; a fifth-wheel connected to the frame in the rear of said mowers; and a third mower attached to the frame through said fifth wheel.

6. A mowing machine having in combination a frame; rows of mowers, one of said rows being attached to said frame in position to leave an uncut swath, the other row being in position to cut said swath, each of said mowers having a rotary cutter and a co-acting stationary cutter bar; and means disposed substantially midway between the rows of mowers enabling one row to assume and maintain a different horizontal angle from the other, said last-named means having a member connected to the frame and forming a horizontal axis about which one row of mowers is free to turn relatively to said frame.

7. The combination in a mowing machine of a frame; two mowers mounted thereon in positions to leave an uncut swath between them; a fifth-wheel having one member connected to the frame so as to be free to turn on a horizontal axis; and a third mower connected with the second member of said fifth-wheel so as to cut the swath left by the other mowers.

8. The combination in a mowing machine of a frame; a plurality of mowers attached thereto of which certain are in positions to leave an uncut swath between them and each having ground wheels with cutting mechanism trailing behind the same; and means on the frame for swinging the cutting mechanism of any mower upon the axes provided by its ground wheels to render it inoperative at will.

9. The combination in a mowing machine of a frame; two mowers attached thereto in positions to leave an uncut swath between them; a third mower attached to the frame in position to cut said swath; each of said mowers including ground wheels; an axle for said wheels and cutting mechanism trailing behind the wheels; and means on the frame for rendering any of said mowers inoperative at will, the same consisting of hand operated devices for swinging the cutting mechanism of any one of said mowers upwardly about its axle as an axis.

10. A mowing machine having in combination three mowers of which one is to the rear of the others, each of said mowers including a rotary cutter and a co-acting stationary cutter bar; a frame connecting and supported solely by all of said mowers; an operator's seat on the frame; and means including a group of levers adjacent the operator's seat and turnable about a common axis for rendering the mowers inoperative at will.

11. The combination in a mowing machine of a frame having vertical guide ways; a bolster pivotally connected to the frame between and vertically movable in said guide ways; and a mower operatively connected to said bolster and held thereby from movement except in the vertical plane defined by said guide ways.

12. The combination in a mowing machine of a transversely extending frame including downwardly extending guide ways adjacent its extremities respectively; bolsters pivoted to the frame and directed by said guide ways so as to be movable in vertical planes only; with mowers respectively connected to said bolsters and held thereby from movement other than in vertical planes.

13. The combination in a mowing machine of a frame; a mower connecting structure at each end of said frame including two pairs of parallel plates; bolsters pivoted to said structures respectively and guided in a vertical plane by the plates thereof; and mowers respectively engaging each of said bolsters and rigidly held thereby from movement except in a vertical plane.

14. The combination in a mowing machine of a frame having transversely extending elements; bolsters extending parallel to said elements and pivotally connected thereto to oscillate in a vertical plane; and mowers connected to said bolsters respectively.

15. The combination in a mowing machine of a frame having transversely extending elements; substantially parallel pivot members extending between said elements adjacent their extremities respectively; elongated bolsters mounted on said pivot members and free to oscillate in a substantially vertical plane; and mowers pivotally connected to the bolsters adjacent the ends thereof.

16. The combination in a mowing machine of a frame; two mowers attached thereto in positions to leave an uncut swath between them; a third mower attached to the frame in position to cut said swath; each of said mowers including ground wheels, an axle for said wheels and cutting mechanism trailing behind the wheels; and means on the frame for rendering any of said mowers inoperative at will, the same consisting of lever operated devices for swinging the cutting mechanism of any one of said mowers upwardly about its axle as an axis.

In testimony whereof, I have signed my name to this specification, in the presence of two subscribing witnesses.

SAMUEL P. TOWNSEND.

Witnesses:
WM. T. SIGLER,
PAUL A. COLEMAN.